Feb. 27, 1962  C. L. McALISTER  3,023,289
PROTECTORS FOR ELECTRIC CIRCUITS
Filed April 25, 1958
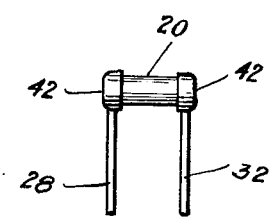
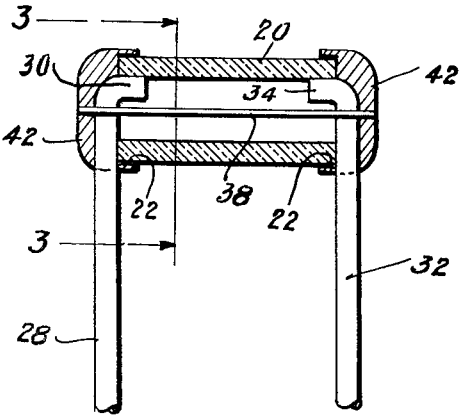
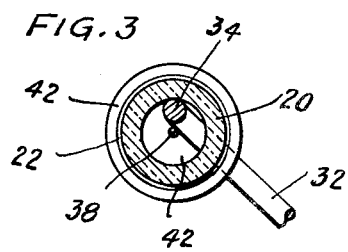
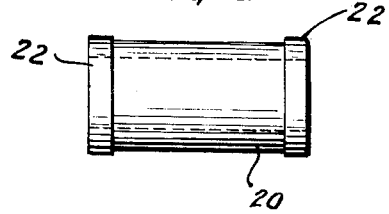
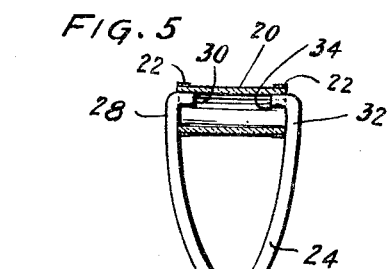
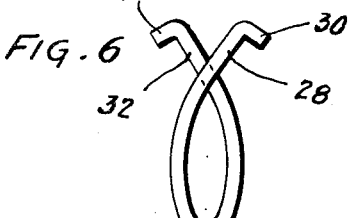
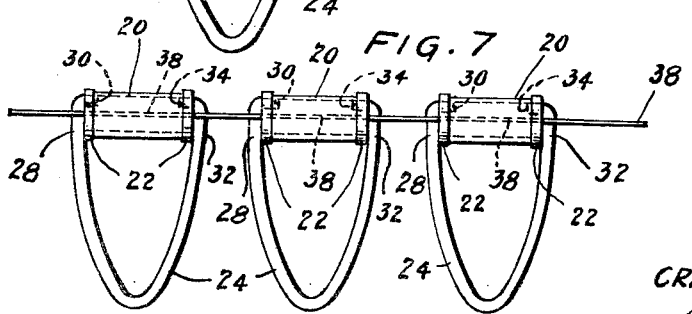
INVENTOR
CRAIG L. McALISTER
BY Ray Eilers ATT'Y.

United States Patent Office 3,023,289
Patented Feb. 27, 1962

3,023,289
PROTECTORS FOR ELECTRIC CIRCUITS
Craig L. McAlister, Overland, Mo., assignor to McGraw-Edison Company, Chicago, Ill., a corporation of Delaware
Filed Apr. 25, 1958, Ser. No. 731,059
13 Claims. (Cl. 200—131)

This invention relates to improvements in protectors for electric circuits. More particularly, this invention relates to improvements in hermetically sealed electric fuses.

It is therefore an object of the present invention to provide an improved, hermetically sealed electric fuse.

It is frequently desirable to enclose electrical components in casings and to embed those encased components in a protective mass of insulating material. Specifically, it is desirable to dispose encased electrical components in a protective housing and fill that housing with pitch or some other insulating material, or to mold rubber or some other moldable insulating material around those components. In either instance, the encased electrical components will be protected by the insulating material.

Where a protective housing is to be filled with pitch or some other insulating material, it is desirable to reduce the air pressure in that housing as it is filled; thereby enhancing the removal of air from that housing and largely eliminating voids in the insulating material. Conversely, where the encased electrical components are to have rubber or some other moldable insulating material molded around them, it is desirable to apply sizable pressures to the insulating material; thereby fostering the elimination of voids in the insulating material, and firmly bonding the insulating material to those components.

Encased electrical components that are to be embedded in insulating material in these ways should be so made that the embedding operation will not impair the operability of those electrical components. Where those electrical components are electric fuses, those electrical components should be encased in casings that will prevent entry of the insulating material; because engagement of the insulating material with the electric fuses could change the ratings of those electric fuses.

Most electric fuses that are to be embedded in masses of insulating material in these ways are small in size; and such electric fuses usually are provided with glass casings and with ferrules that close the ends of those casings. Those casings and ferrules will resist, and can sometimes prevent, the entry of insulating material into those casings; but it is desirable to positively preclude the entry of insulating material into those casings. The present invention does positively preclude the entry of insulating material into the casings of electric fuses by hermetically sealing those casings. Consequently, the electric fuse which is provided by the present invention can be embedded within insulating material without any of the insulating material entering the casing of that protector for electric circuits. It is therefore an object of the present invention to provide a hermetically sealed electric fuse that can be safely embedded in a mass of insulating material.

The electric fuse that is provided by the present invention has a casing of air-impervious insulating material such as glass, and the ends of that casing will be sealed by masses of metallic bonding material or by ferrules bonded to those ends. While metallic bonding material can adhere to glass, that bonding material will not always adhere to glass with sufficient intimacy to provide an hermetic seal. Yet, such a seal is absolutely vital. The present invention attains an hermetic seal with the glass casing of the electric fuse by metallizing the ends of that casing and applying a metallic bonding material to those metallized ends. It is therefore an object of the present invention to provide a protector for electric circuits with a glass casing which has metallized ends and which has metallic bonding material intimately bonded to those metallized ends.

Where the electric fuse is intended to "blow" on small currents, the fusible conductor thereof is necessarily of small cross section. Where that electric fuse is intended to interrupt small currents at low voltages, it is desirable to make that electric fuse as small as possible. This is particularly desirable because of the ever-increasing deman for miniaturization. Yet, the smaller the electric fuses become, the more difficult it is to manufacture them. The present invention provides a method of assembling electric fuses that makes it possible to manufacture extremely small electric fuses.

In making an electric fuse by the method of the present invention, a relatively stiff conductor is bent so it is generally circular in configuration, so it has its two ends projecting outwardly beyond the circle, and so those ends have hooks therein. The two ends of the conductor normally overlap, but they can be spread apart to permit the hooks thereon to be inserted in the opposite ends of the glass casing. When those hooks are so inserted and then permitted to seat in those ends, the resilience of the conductor will cause those hooks to hold themselves solidly in the ends of the casing. This is desirable because it holds the conductor in assembled relation with the casing and frees the assembler from all need of holding both the casing and the conductor. The casing can either be grasped between the assembler's fingers or can be held by being threaded onto a length of fusible conductor. Thereafter, the metallic bonding material can be applied to the ends of the casing to bond itself to the metallized ends of that casing and also to electrically interconnect the hooked ends of the stiff conductor with the opposite ends of the fusible conductor. That metallic bonding material will integrate the various parts and permanently assemble them together. It is then only necessary to snip off the ends of the fusible conductor and to sever the stiff conductor intermediate the hooks in the ends thereof, and a finished electrical fuse with two projecting terminals results. It is therefore an object of the present invention to make electric fuses by bending a relatively stiff conductor so it has two hooks that are normally closer together than the ends of a casing, to spread the hooks apart until they can telescope into the ends of the casing, to release the hooks so they can seat in the ends of the casing, to subsequently apply metallic bonding material to the ends of the casing to bond together the metallized ends of the casing and the hooked ends of the stiff conductor and the ends of a fusible conductor, and thereafter to snip off the ends of the fusible conductor and to sever the stiff conductor intermediate its hooked ends.

Where the electric fuses are very small, the fusible conductors will have very small cross sectional areas, and those conductors will be quite flexible. Such a fusible conductor can be guided into the casing of the electric fuse by threading it through the eye of a needle, and then passing the needle through the casing for the electric fuse. In this way, the fusible conductor can be introduced into the casing for the electric fuse either before or after the hooked ends of the stiff conductor are seated in the ends of that casing.

Other and further objects and advantages of the present invention should become apparent from an examination of the drawing and accompanying description.

In the drawing and accompanying description a preferred embodiment of the present invention is shown and described but it is to be understood that the drawing and accompanying description are for the purpose of illustration only and do not limit the invention and that the invention will be defined by the appended claims.

In the drawing,

FIG. 1 is a side elevational view of an electric fuse that is made in accordance with the principles and teachings of the present invention, FIG. 2 is a longitudinal sectional view, on a greatly enlarged scale, of the electric fuse shown in FIG. 1, FIG. 3 is a cross sectional view, on said greatly enlarged scale, through the electric fuse shown in FIG. 2, and it is taken along the plane indicated by the line 3—3 in FIG. 2.

FIG. 4 is a side elevational view, on said greatly enlarged scale, of the casing for the electric fuse of FIGS. 1-3, FIG. 5 is a side elevational view, on a less enlarged scale, of the casing of FIG. 4 assembled with a stiff conductor which has had hooks formed in the ends thereof, FIG. 6 is a side elevational view of the stiff conductor of FIG. 5 before the hooks of that conductor are seated in the ends of the casing of FIG. 4, and FIG. 7 is a side elevational view of a number of casings and stiff conductors which have been assembled in the manner shown in FIG. 5 and are threaded onto a length of fusible conductor.

Referring to the drawing in detail, the numeral 20 generally denotes a tubular casing of insulating material. Preferably, that casing will be made of an air-impervious, hard, insulating material such as glass. The numeral 22 denotes metallized deposits on the ends of the casing 20. One way of forming these metallized deposits is to coat the opposite ends of the casing 20 with Conducting Coating Material No. 6808 of E. I. du Pont de Nemours & Co., and then fire the coated casing 20 at temperatures of about one thousand two hundred and fifty (1,250) degrees Fahrenheit for about one half (½) hour. The said coating material should be viscous, but it should be capable of flowing so it can provide an even deposit of metallized material on the ends of the casing 20. If necessary, the said coating material can be thinned somewhat with toluol or xylol.

The metallized portions 22 can, if desired, have a coating or layer of metal electrodeposited on them. One such metal is copper; and a coating or layer of copper is desirable because it facilitates the securement of metallic bonding material to the metallized portions 22.

The numeral 24 denotes a length of a relatively stiff conductor which has been bent to have a generally circular configuration but to have projecting ends 28 and 32. The end 32 has a hook 34 formed therein and the end 28 has a hook 30 formed therein. These ends normally overlie each other, as shown particularly by FIG. 6, but they can be moved apart, as indicated particularly by FIG. 5. When moved apart, the ends 28 and 30 direct the hooks 30 and 34 toward each other; and those ends can be spread far enough apart to permit the casing 20 to be disposed between the confronting ends of the hooks 30 and 34. Thereafter, the spreading force exerted on the conductor 24 can be relaxed, and the hooks 30 and 34 can be permitted to enter and seat in the ends of the casing 20. The resilience of the material of which the conductor 24 is made is such that the ends 28 and 32 will press against the ends of the casing 20 with sufficient force to prevent accidental separation of the conductor 24 from that casing.

Either before the hooks 30 and 34 are seated in the opposite ends of the casing 20 or after those hooks have been seated in the opposite ends of that casing, a conductor 38 of small cross sectional area is threaded through the casing 20. This small conductor is the fusible conductor of the electric fuse provided by the present invention. To facilitate the introduction of the small conductor 38 into the casing 20, that conductor should be threaded through the eye of a needle and the needle then passed through the casing 20.

In the commercial production of the electric fuse shown in FIG. 1, it is desirable, as shown by FIG. 7, to telescope a number of the casings 20 over a continuous length of fusible conductor 38. Such an arrangement facilitates the handling of the various components of the various electric fuses, and also speeds up the making of those electric fuses.

Once the small conductor 38 has been telescoped through the casing 20, and the hooks 30 and 34 have been seated in the ends of that casing, a metallic bonding material 42, such as solder, is brought into engagement with the ends of the casing 20. Where that metallic bonding material is solder, it will be in the molten state and will heat the metallized surfaces 22 on the ends of the casing 20, will heat the hooks 30 and 34 of the conductor 24, and will also heat the fusible conductor 38. That metallic bonding material will thereafter be permitted to solidify and harden; and it will then provide an intimate electrical engagement between the fusible conductor 38 and the ends 28 and 32 while also hermetically sealing both ends of the casing 20.

Electric fuses that are made in accordance with the principles and teachings of the present invention are able to prevent ingress or egress of air or other matter into or out of the casing 20. The completed electric fuses are tested by immersing them in a liquid which has been colored by the addition of a dye. During their immersion in that liquid, the pressure on that liquid is reduced as by largely evacuating the container for that liquid; and the reduced pressure is maintained for a number of minutes. If the electric fuses are not hermetically sealed, air will leak out of the casings of those electric fuses; and bubbling will be noticed at the surface of that liquid. At the end of the prescribed number of minutes, the pressure is permitted to rise to atmospheric pressure. If any of the electric fuses had not been hermetically sealed, the liquid would have been drawn into the casing 20 as the pressure rose to atmospheric pressure; and that liquid would be readily visible because the glass casings 22 are transparent and the liquid was dyed a bright color.

By use of the present invention it is possible to make extremely small electric fuses. For example, the overall length of one electric fuse that is made in accordance with the principles and teachings of the present invention is less than three eighths (⅜) of an inch and the overall diameter of that electric fuse is less than three sixteenths (³⁄₁₆) of an inch.

Where desired, ferrules can be used to help close the ends of the casing 20. In any such instances, the bonding material will bond the ferrules to the metallized surfaces 22 at the opposite ends of the casing 20.

Whereas the drawing and accompanying description have shown and described a preferred embodiment of the present invention it should be apparent to those skilled in the art that various changes may be made in the form of the invention without affecting the scope thereof.

What I claim is:

1. The method of making a protector for electric circuits which comprises metallizing the ends of the casing for said protector, electrodepositing a film of metal on each of said metallized ends, inserting a current-responsive element in said casing, disposing terminals adjacent said ends of said casing, and applying electrically conducting bonding material directly to said casing and to said electrodeposited film on said ends of said casing and to said current-responsive element and to the terminals of said protector to electrically connect said terminals and said current-responsive element and to fixedly bond said terminals to said electrodeposited films on said ends of said casing and thereby hermetically seal said ends of said casing by filling and closing said ends of said casing.

2. The method of making a protector for electric circuits which comprises metallizing the ends of the casing for said protector, inserting a current-responsive element in said casing, disposing terminals adjacent said ends of said casing, and applying electrically conducting bonding material directly to said casing and to said ends of said casing and to said current-responsive element and to the terminals of said protector to electrically connect said terminals and said current-responsive element and to fixedly bond said terminals to said ends of said casing and thereby hermetically seal said ends of said casing by filling and closing said ends of said casing.

3. The method of making a hermetically sealed protector for electric circuits which comprises bending an electrical conductor to have hooks in the ends thereof and to space said hooks apart a distance less than the length of the casing for said protector, metallizing the ends of said casing, spreading said hooks apart a distance greater than said length of said casing, positioning said hooks within the ends of said casing to enable said hooks to hold themselves and said conductor in assembled relation with said casing, inserting a current-responsive element in said casing, applying metallic bonding material to said ends of said casing to electrically connect said hooks to said current-responsive element and to bond said hooks to said metallized ends on said casing and thereby hermetically seal said ends of said casing, and severing said conductor intermediate the ends thereof to form terminals for said protector for electric circuits.

4. The method of making a protector for electric circuits which comprises bending an electrical conductor to have hooks in the ends thereof and to space said hooks apart a distance less than the length of the casing for said protector, spreading said hooks apart a distance greater than said length of said casing, positioning said hooks within the ends of said casing to enable said hooks to hold themselves and said conductor in assembled relation with said casing, inserting a current-responsive element in said casing, applying metallic bonding material to said ends of said casing to electrically connect said hooks to said current-responsive element and to bond said hooks to said casing, and severing said conductor intermediate the ends thereof to form terminals for said protector for electric circuits.

5. The method of making an electric fuse which comprises forming a wire with hook-like portions at the ends thereof, metallizing the ends of the casing for said fuse, inserting said hook-like portions in the ends of the casing for said fuse, disposing a fusible element in said casing, applying solder directly to said casing and to the metallized ends of said casing to electrically interconnect said hook-like portions and said fusible element and to hermetically seal said ends of said casing by filling and closing said ends of said casing, and cutting said wire to form two terminals for said fuse.

6. The method of making a protector for electric circuits which comprises forming a wire so the ends thereof can be positioned adjacent and in register with the ends of the casing for said protector, disposing a current-responsive element in said casing, applying electrically conducting bonding material directly to said casing and to said ends of said wire and to the ends of said current-responsive element to electrically and physically connect same, and cutting said wire to form two terminals for said protector.

7. The method of making a protector for electric circuits which comprises forming a wire with hook-like portions at the ends thereof, inserting said hook-like portions in the ends of the casing for said protector, disposing a current-responsive element in said casing, applying electrically conducting bonding material directly to said casing and to said hook-like portions and to said current-responsive element to electrically and physically connect same, and cutting said wire to form two terminals for said protector.

8. The method of making an electric fuse which comprises forming a wire with hook-like portions at the ends thereof, inserting said hook-like portions in the ends of the casing for said fuse, disposing a fusible element in said casing, applying solder directly to said casing and to the ends of said casing to electrically and physically connect said hook-like portions and said fusible element and to close said ends of said casing, and cutting said wire to form two terminals for said fuse.

9. A protector for electric circuits that comprises a tubular, thin-walled casing, metallized surfaces on said casing adjacent the ends of said casing, a film of metal on each of said metallized surfaces, said films of metal being adapted to coact with metallic bonding material to provide an intimate seal, a current-responsive element that is disposed within said casing, terminals that extend into openings defined by said ends of said casing and that also project outwardly beyond said ends of said casing, said current-responsive element and said terminals having cross sections that are only small fractions of the cross sections of said openings defined by said ends of said casing, and metallic bonding material that extends between said terminals and said current-responsive element and said films of metal on said ends of said casing and that fills and closes said openings defined by said ends of said casing, said metallic bonding material electrically connecting said terminals to said current-responsive element and also bonding to said films of metal on said metallized surfaces adjacent said ends of said casing, said metallic bonding material extending radially outwardly beyond the peripheries of said ends of said casing and extending toward the longitudinal center of said casing to constitute cup-shaped closures and hermetic seals for said ends of said casing.

10. A protector for electric circuits that comprises a tubular, thin-walled casing, metallized surfaces on said casing adjacent the ends of said casing, said metallized surfaces being adapted to coact with metallic bonding material to provide an intimate seal, a current-responsive element that is disposed within said casing, terminals that extend into openings defined by said ends of said casing and that also project outwardly beyond said ends of said casing, said current-responsive element and said terminals having cross sections that are only small fractions of the cross sections of said openings defined by said ends of said casing, and metallic bonding material that extends between said terminals and said current-responsive element and said metallized surfaces adjacent said ends of said casing and that fills and closes said openings defined by said ends of said casing, said metallic bonding material electrically connecting said terminals to said current-responsive element and also bonding to said metallized surfaces adjacent said ends of said casing, said metallic bonding material extending radially outwardly beyond the peripheries of said ends of said casing and extending toward the longitudinal center of said casing to constitute cup-shaped closures and hermetic seals for said ends of said casing.

11. A protector for electric circuits that comprises a tubular, thin-walled casing, a current-responsive element that is disposed within said casing, terminals that extend into openings defined by said ends of said casing and that also project outwardly beyond said ends of said casing, said current-responsive element and said terminals having cross sections that are only small fractions of the cross sections of said openings defined by said ends of said casing, and metallic bonding material that extends between said terminals and said current-responsive element and that fills and closes said openings defined by said ends of said casing, said metallic bonding material electrically connecting said terminals to said current-responsive element, said metallic bonding material extending radially outwardly beyond the peripheries of said ends of said casing and extending toward the longitudinal center of said casing to constitute cup-shaped closures and hermetic seals for said ends of said casing.

12. A protector for electric circuits that comprises a casing which has openings defined thereby, a current-responsive element that is disposed within said casing, terminals that are adjacent said openings defined by said casing, said current-responsive element and said terminals having cross sections that are only small fractions of the cross sections of said openings defined by said casing, and metallic bonding material that extends between said terminals and said current-responsive element and that fills and closes said openings defined by said casing, said metallic bonding material electrically connecting said terminals to said current-responsive element, said metallic bonding material and said current-responsive element and said terminals constituting the sole means of closing said openings defined by said ends of said casing, said metallic bonding material extending radially outwardly beyond the peripheries of said ends of said casing and extending toward the longitudinal center of said casing to constitute cup-shaped closures and hermetic seals for said ends of said casing.

13. An electric fuse that comprises a casing with openings therein, a current-responsive element that is disposed within said casing, terminals that are adjacent said openings defined by said casing, said current-responsive element and said terminals having cross sections that are only small fractions of the cross sections of said openings defined by said casing, and metallic bonding material that extends between said terminals and said current-responsive element and that fills and closes said openings defined by said casing, said metallic bonding material electrically connecting said terminals to said current-responsive element.

References Cited in the file of this patent

UNITED STATES PATENTS

| | | |
|---|---|---|
| 861,315 | Pierce | July 30, 1907 |
| 1,093,893 | Stoll | Apr. 21, 1914 |
| 2,644,066 | Glynn | June 30, 1953 |
| 2,847,537 | Kozacka | Aug. 12, 1958 |
| 2,864,926 | Pritikin | Dec. 16, 1958 |

FOREIGN PATENTS

| | | |
|---|---|---|
| 161,244 | Australia | Feb. 17, 1955 |
| 580,759 | Great Britain | Sept. 18, 1946 |